United States Patent [19]

Sugitani et al.

[11] Patent Number: 4,827,101
[45] Date of Patent: May 2, 1989

[54] METHOD FOR CONTROLLING A BEAD

[75] Inventors: Yuji Sugitani; Yoshikazu Sato, both of Tokyo, Japan

[73] Assignee: NKK Corporation, Tokyo, Japan

[21] Appl. No.: 215,024

[22] Filed: Jul. 5, 1988

[30] Foreign Application Priority Data

Jul. 10, 1987 [JP] Japan ................... 62-171196

[51] Int. Cl.$^4$ .................................. B23K 9/12
[52] U.S. Cl. ......................... 219/124.1; 219/124.5
[58] Field of Search ............ 219/124.32, 124.1, 124.5, 219/124.22, 124.34

[56] References Cited

U.S. PATENT DOCUMENTS 3,264,447  8/1966  Agnew ..................... 219/124.22
4,005,308  1/1977  Chaney et al. .............. 219/124.5

FOREIGN PATENT DOCUMENTS 61-137676  6/1986  Japan .

Primary Examiner—Clifford C. Shaw
Attorney, Agent, or Firm—Frishauf, Holtz, Goodman & Woodward

[57] ABSTRACT

A method for controlling a bead, in one-side automatic welding wherein a backing metal strip is adhered to the back side of a pair of work pieces through an inorganic material and arc welding is applied to the work pieces on the surface side thereof, comprises:detecting an electrical signal between the work pieces and the backing metal strip to control a weld current so that the detected electrical signal can be equal to a predetermined reference signal; and detecting the controlled weld electrical current and putting the detected weld electrical current into a formula of $V_1=V_0 \cdot I_L/I_{L0}$ to calculate a welding speed; and controlling the welding speed in accordance with the calculated welding speed, where $V_1$ represents the calculated welding speed, $V_0$ an initial value of the welding speed, $I_L$ the detected weld electrical current and $I_{L0}$ a predetermined reference weld current. The electrical signal can be an electrical current signal or a voltage signal.

6 Claims, 3 Drawing Sheets

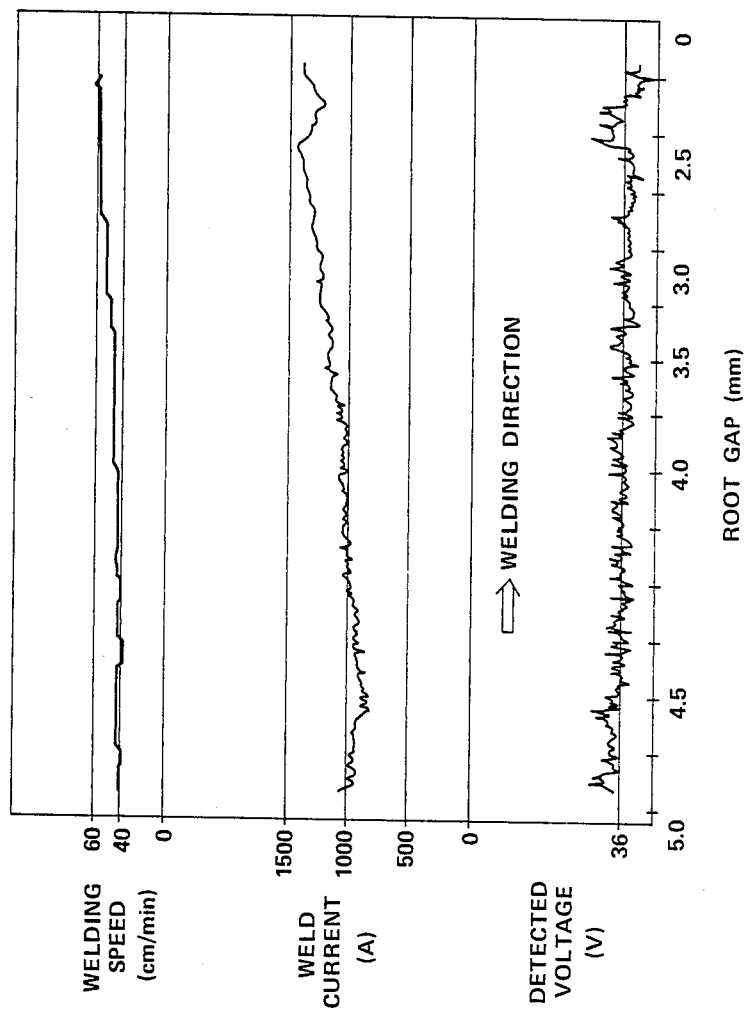

METHOD FOR CONTROLLING A BEAD

BACKGROUND OF THE INVENTION

1. Field of the Invention

The present invention relates to a method for controlling a bead in a one-side automatic welding technique wherein a backing strip is used on the back side of a pair of work pieces, and more particularly, to a method for controlling simultaneously beads on the surface and back sides of the work pieces.

2. Description of the Prior Art

A one-side automatic welding technique is widely used for welding structures such as a gaint structure and the like which cannot be turned over. But, a shape of a bead formed by the automatic welding is dependent on the accuracy of a root gap. Accordingly, a control method for correcting automatically weld parameters relative to the shift of the root gap which changes during the welding is necessary for obtaining an appropriate shape of the bead formed over the whole length of a weld line.

A prior art method is disclosed as a method for controlling a penetration bead in a Japanese Patent Application Laid Open (KOKAI) No. 137676/86 wherein:

(a) Inorganic material, to which a metal strip is adhered, is used as a backing strip;

(b) Electrical current between a pair of work pieces and the metal strip is detected; and (c) The width of a penetration bead is controlled so as to be constant by controlling the detected electrical current.

In the mentioned prior art one-side automatic welding method, the width of the penetration bead is formed to be constant, regardless of the accuracy of a root gap. However, so far as a bead on the surface side is concerned, the prior art has disadvantages in that the height of the bead is not uniformly formed and moreover, in that an insufficient reinforcement of the weld occurs especially in a case where a root gap widens.

SUMMARY OF THE INVENTION

It is an object of the present invention to provide a method for controlling a bead wherein a penetration based is formed so as to be constant in shape without being subject to the accuracy of a root gap and the elevation of the reinforcement of the weld is formed constantly at a height in the appropriate range.

To attain the above-mentioned object, in accordance with the present invention, a method is provided for controlling a bead, in one-side automatic welding wherein a backing metal strip is adhered to the back side of a pair of work pieces through an inorganic material and arc welding is applied to the work pieces on the surface side thereof, which comprises;

detecting an electrical signal between the work pieces and the backing metal strip to control a weld current so that the detected electrical signal can be equal to a predetermined reference signal; and detecting the controlled weld current and putting the detected weld current into the following formula to calculate a welding speed, and for controlling the weld speed in accordance with the calculated welding speed.

$V_1 = V_0 \cdot I_L / I_{L0}$, where $V_1$ represents the calculated weld speed, $V_0$ an initial value of the welding speed, $I_L$ the detected weld current and $I_{L0}$ a predetermined reference weld current.

BRIEF DESCRIPTION OF THE DRAWINGS

FIG. 6 is a graphical representation showing a relation among a detected voltage, a weld electrical current and a welding speed relative to a change of root gap, according to the present invention.

DESCRIPTION OF THE PREFERRED EMBODIMENT

Figure 1:
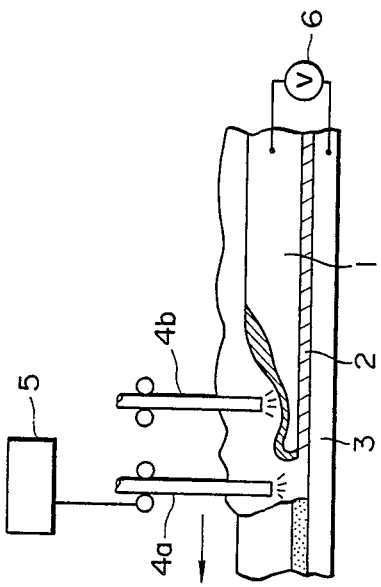
FIG. 1 is a longitudinal sectional view showing schematically a one-side automatic welding technique carried out by means of a submerged arc welding system using two electrodes according to the present invention.

An embodiment of the present invention will now be explained with specific reference to the attached drawings. FIG. 1 schematically shows a longitudinal sectional view of a one-side arc welding system using a gas shielded arc using by mean of two electrodes according to the present invention. In the drawing, referential numeral 1 denotes a pair of work pieces. 2 denotes an inorganic material such as flux and the like being adhered to the back side of a pair of work pieces 1 by means of backing metal strip 3, 4a and 4b electrodes, 5 a weld power source and 6 a voltmeter.

Control of a Bead Width

Figure 3:
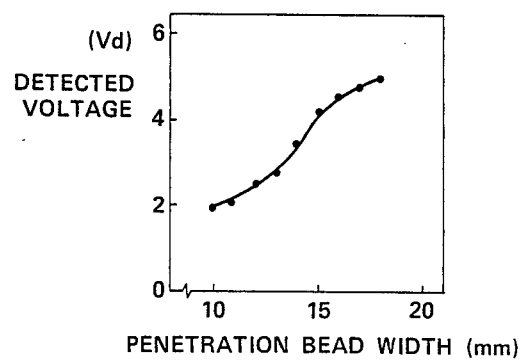
FIG. 3 is a graphical representation showing the relation of a detected voltage between a backing metal strip and work pieces, to a width of a penetration bead of the present invention.

In the one-side welding system of FIG. 1, an electrical current between backing metal strip 3 and a pair of work pieces 1 is zero at the initial stage of the welding. When a good penetration bead is formed after the welding is started, the arc generated from electrode wire 4a leaks from a pair of work pieces 1 and reaches backing metal strip 3 through inorganic material 2 such as flux and the like and voltage V is generated between the work pieces 1 and backing metal strip 3. This voltage V is detected by voltmeter 6, and a relation between the detected voltage $V_d$ and penetration bead width $W_B$ is investigated. The results are shown in FIG. 3. As shown in the graph of FIG. 3, the detected voltage of $V_d$ and the penetration bead of $W_B$ show a good correlation. Therefore, if this correlation is made use of, a reference voltage $V_0$ for forming a predetermined penetration bead width can be set up. Thus, the control of the penetration bead width can be carried out simultaneously on one welding process line.

Figure 2:
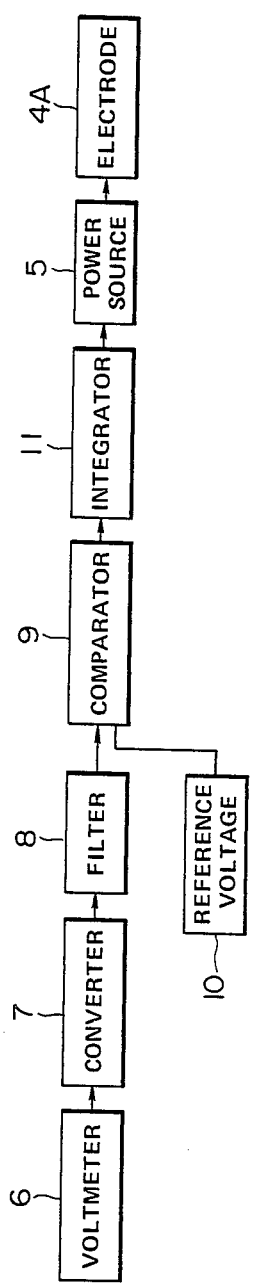
FIG. 2 is a block diagram illustrating a flow of controlling a weld electrical current according to the present invention.

A block diagram of the control system which is used for the method for controlling the penetration bead in the one-side welding process is shown in FIG. 2. In this diagram, referential numeral 7 denotes a converter for turning into a direct current signal a voltage of $V_d$ between a pair of work pieces 1 and backing metal strip 3 which is detected by voltmeter 6. Only the signals necessary to control the bead are selected and taken out by filter 8 out of the voltage signals outputted from converter 7 and inputted into comparator 9. The voltage signals inputted into comparator 9 are compared with reference voltage signal 10 which is set up in advance so as to correspond to a predetermined penetration bead width in compliance with the correlation between the penetration bead width of $W_B$ and the detected voltage of $V_d$ as shown in FIG. 3. Comparator 9 inputs difference signals between two voltage signals into weld power source 5 through integrator 11 which levels the fluctuation of the difference signals. In weld power source 5, weld electrical current corresponding to the inputted difference signals is outputted. Namely, the control is carried out so that the voltage signals between a pair of work pieces 1 and backing metal strip 3 can be always equal to reference voltage signals 10. Thus, by means of the aforementioned control, the penetration bead width is controlled to be constant. In this embodiment, voltage V between a pair of work pieces 1 and backing metal strip 3 is directly detected. This method, however, can also be alternated by a method wherein a voltage (arc voltage) between electrode 4a and the work pieces, and another voltage between electrode 4a and backing metal strip 3 are respectively measured to obtain a difference between those two voltages and then, the difference is controlled to be constant, and thereby the penetration bead width is controlled.

In this embodiment, voltage is used as the detected electrical signals and the reference electrical signal. However, an electrical current can be used instead of the voltage. The weld parameters to be controlled are not limited to the weld electrical current. The parameters can be any one of those including arc voltage, weld electrical current, welding speed and wire extension, so long as they are effective in forming the penetration bead and, at the same time, are able to control detected signals. Furthermore sources of generating the detected signals are not limited to the weld power source. Instead, a signal generator (which has frequency, electrical current and voltage characteristics different from the weld power source) is independently arranged, and the signals are put into the signal generator, and then, the output therefrom can be the detected signal, apart from the weld power source.

Simultaneous Control of Penetration Bead width and Surface Side Bead Height

Secondly, in accordance with the above-mentioned method for controlling the width of the penetration bead, a method for controlling simultaneously the width of the penetration bead and the height of the surface side bead will now be explained.

Figure 4:
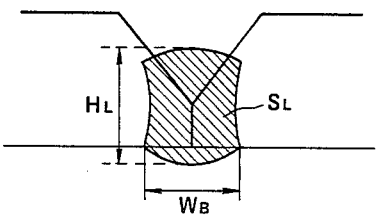
FIG. 4 is a transverse sectional view showing a groove nugget of the present invention.

FIG. 4 is a sectional view illustrating a groove nugget of the present invention. In the drawing, $S_L$ denotes an area of the nugget, $W_B$ a penetrating bead width and $H_L$ a bead height. When as mentioned above, the control of the penetration bead, in which the weld electrical current is controlled, enables the width of the penetration bead to be maintained constantly at a predetermined value. In order to, at the same time, maintain bead height $H_L$ at a predetermined level, it is sufficient that the welding speed is varied so as to let a ratio of the weld electrical current $I_L$ to welding speed $V_1$ i.e. $I_L/V_1$ become constant, this weld electrical current flowing in preceding electrode 4a (FIG. 1) at the time of controlling the penetration bead. The reason for this is as follows: If $I_L/V_1$ is constant, the heat input is constant. Therefore, the nugget area $S_L$ is constant because it is in proportion to the heat input. Since the shape of the nugget is almost rectangular and the weld electrical current of $W_B$ is constant, the bead height of $H_L$ becomes constant.

On the other hand, because reference weld electrical current $I_{L0}$ for forming a predetermined bead height for a standard groove can be set up, based on experience, welding speed $V_1$, for making a bead height $H_L$ constant is determined by the following formula:

$V_1 = V_0 \cdot I_L/I_{L0}$ —formula (1), where $V_0$ represents an initial valve of the welding speed.

Suppose, for example, that preceding weld electrical current $I_L$ becomes 1200 A, when the control of the penetration bead is carried out on condition of reference weld electrical current $I_{L0}$: 1,450 A and initial value of welding speed $V_0$: 60 cm/min., then welding speed $V_1$ should be determined as 48.8 cm/min. according to the formula (1).

Figure 5:
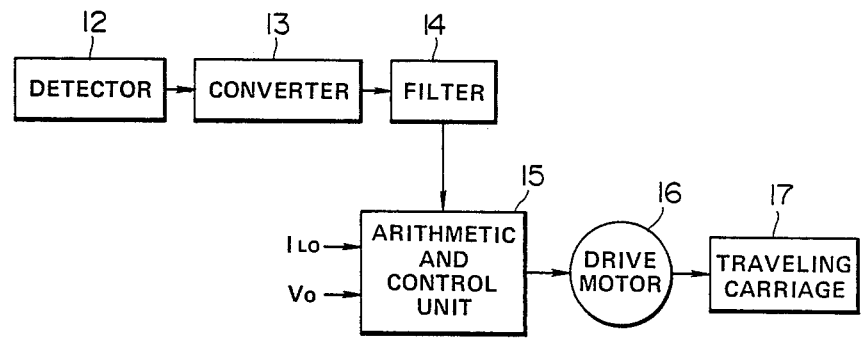
FIG. 5 is a block diagram showing a flow of controlling a welding speed according to the present invention.

FIG. 5 shows a block diagram showing a flow of controlling a welding speed in accordance with the formula (1). In FIG. 5, referential numeral 12 denotes a detector of weld electrical current $I_L$ and signals detected by the detector are converted into direct electrical signals by means of converter 13. However, it should be noted that this converter is not needed when a direct electrical source is used as a weld power source. The direct electrical signals outputted from converter 13 are inputted to arithmetic and control unit 15 after their noises are removed by means of filter 14. Arithmetic and control unit 15 performs processing of the direct electrical signals in accordance with the formula (1) to compute a welding speed $V_1$ which can form a predetermined bead height. An order of speed meeting the computed value of $V_1$ is sent to drive motor 16 of travelling carriage 17, and the actual welding speed is controlled to be equal to $V_1$. Moreover, most of the one side automatic welding methods are carried out by means of plural electrode welding using more than two electrodes. Accordingly, it is preferable that weld electrical current of a preceding electrode is used as the weld electrical current to be controlled, when the method of the present invention is applied to a plural electrode welding system.

As mentioned above, according to the method of controlling the penetration bead in the one-side automatic welding method, not only is the preceding weld electrical current controlled to control the penetration bead width to be constant, but also the welding speed is controlled in accordance with the controlled weld electrical current, whereby the one-side welding method can have an effect in keeping a constant bead height on the surface side of the work pieces.

EXAMPLE

An example using experiments of the welding in accordance with the method of the present invention is shown in FIG. 6. In this example, a tapered root gap of from 0 to 5 mm was welded by a three electrode submerged arc welding system. The graphical representation of FIG. 6 indicates a relation among the detected voltage, the preceding weld electrical current and the welding speed relative to the change of the root gap.

The weld speed $V_1$ is controlled on the basis of the formula (1). In this case, conditions on welding are as follows:

|  | Electrical current | Voltage |
|---|---|---|
| Preceding Electrodes | Automatic control | 36 V |

|  | Electrical current | Voltage |
| --- | --- | --- |
| Intermediate Electrodes | 900 A | 42 V |
| Following Electrodes | 1000 A | 45 V |

As a result of the experiment, the uniform height of a bead on the surface side of the work pieces could be obtained. On condition of the above-mentioned root gap, when the welding speed is constant, an insufficient reinforcement of the bead formed on the surface side began to occur over the vicinity of 3 mm.

According to the method of the present invention, however, a uniform bead height was formed.

What is claimed is:

1. A method for controlling a bead, in one-side automatic welding wherein a backing metal strip is adhered to the back side of a pair of work pieces through an inorganic material and arc welding is applied to the work pieces on the surface side thereof, comprising:

detecting an electrical signal between the work pieces and the backing metal strip to control a weld current so that the detected electrical signal can be equal to a predetermined reference signal; and detecting the controlled weld electrical current and putting the detected weld electrical current into the following formula to calculate a welding speed, and controlling the welding speed in accordance with the calculated welding speed:

$V_1 = V_0 \cdot I_L / I_{L0}$, wherein $V_1$ represents the calculated welding speed, $V_0$ an initial value of the welding speed, $I_L$ the detected weld electrical current and $I_{L0}$ a predetermined reference weld current.

2. The method of claim 1, wherein the step of detecting the controlled weld electrical current includes detecting a weld electrical current of a preceding electrode when a plural electrode arc welding is carried out.

3. The method of claim 1, wherein the electrical signal includes one of an electrical current signal and a voltage signal.

4. The method of claim 1, wherein the inorganic material includes flux and ceramics.

5. The method of claim 1, wherein the backing metal strip includes a copper sheet.

6. The method of claim 1, wherein the electrical signal includes an electrical signal generated by a weld power source.

* * * * *

UNITED STATES PATENT AND TRADEMARK OFFICE
CERTIFICATE OF CORRECTION

PATENT NO. : 4,827,101

DATED : May 2, 1989

INVENTOR(S) : SUGITANI et al

It is certified that error appears in the above-identified patent and that said Letters Patent is hereby corrected as shown below:

Column 2, line 32, replace "using by mean of" by

--by means of--.

Column 4, line 53, replace "using experiments of" by

--of experiments using--.

Signed and Sealed this

Fifth Day of June, 1990

Attest:

HARRY F. MANBECK, JR.

*Attesting Officer*  *Commissioner of Patents and Trademarks*